United States Patent [19]

Sandler et al.

[11] 4,157,329

[45] Jun. 5, 1979

[54] COPPER AND COBALT CARBONATES AS SMOKE SUPPRESSANTS FOR POLY(VINYL HALIDES)

[75] Inventors: Stanley R. Sandler, Springfield, Pa.; Donald A. Sheldon, Cranbury, N.J.

[73] Assignee: Pennwalt Corporation, Philadelphia, Pa.

[21] Appl. No.: 869,074

[22] Filed: Jan. 13, 1978

[51] Int. Cl.$^2$ ............................................. C08K 3/26
[52] U.S. Cl. ...................... 260/45.75 C; 260/45.75 M
[58] Field of Search ..................... 526/4; 260/45.75 C, 260/45.75 M

[56] References Cited

U.S. PATENT DOCUMENTS

| 3,922,248 | 11/1975 | Kroenke | 260/45.75 C |
| 3,962,163 | 6/1976 | Dickens | 260/45.75 C |
| 3,992,480 | 11/1976 | Dorfman | 260/45.75 C |
| 4,053,451 | 10/1977 | Kroenke | 260/45.75 C |
| 4,053,452 | 10/1977 | Kroenke | 260/45.75 M |

*Primary Examiner*—Paul R. Michl

[57] ABSTRACT

A composition comprising a poly(vinyl halide) resin and a member selected from copper carbonate, cobalt carbonate or mixtures thereof is provided that gives off only a small amount of smoke during combustion.

11 Claims, No Drawings

COPPER AND COBALT CARBONATES AS SMOKE SUPPRESSANTS FOR POLY(VINYL HALIDES)

BACKGROUND OF THE INVENTION

1. Field of the Invention

This invention relates to a smoke suppressant composition of poly(vinyl halide) and a member selected from copper carbonate, cobalt carbonate, or mixtures thereof.

2. Description of Prior Art

Smoke, and especially dense smoke, is a hazard during a fire since the smoke can obscure means of escape and hamper firefighting measures. Hence, it is desirable to develop building materials that emit reduced amounts of smoke during combustion as an added safety feature. The composition of the present invention meets this requirement.

The commercially available poly(vinyl chloride) smoke suppressant, ferrocene (called FE-55 and manufactured by Arapahoe Chemical Co., Inc.), has the disadvantage of being expensive and volatile (vapor pressure is 2.6 mm Hg at 100° C.) at typical milling temperatures of 130°-145° C. Because of the high volatility of FE-55, in laboratory work it is necessary to prepare the FE-55 formulations in a closed system such as a Banbury mixer or Brabender Plasticorder. The use of an open system such as a roll-mill results in significant losses of the FE-55. Arapahoe Chemical Company has reported that FE-55 is not suitable for PVC with more than 10 phr (parts per hundred parts resin) plasticizer since losses of FE-55 due to volatility will occur on long-term aging.

Although copper and cobalt compounds are known in the prior art as smoke suppressants for poly(vinyl halides), the copper and cobalt carbonates of this invention were not found. Some of the prior art copper and cobalt compounds found as smoke suppressants for poly(vinyl halide) are: copper oxides, copper sulfides, cobalt salts, ammonium molybdocobaltate, cobalt chloride, cobalt acetate and cobalt trimellitate. The compositions of this invention give superior smoke suppression results when compared to the prior art compositions.

STATEMENT OF THE INVENTION

The present invention is directed to a composition comprising 100 parts of a poly(vinyl halide) resin and 0.1 to 30 parts of a member selected from copper carbonate, cobalt carbonate or a mixture thereof. All parts by weight unless otherwise indicated.

DETAILED DESCRIPTION OF INVENTION

A variety of poly(vinyl halide) resins can be used in this invention, such as:

1. Homopolymers—Poly(vinyl chloride), poly(vinyl bromide), poly(vinyl fluoride), poly(vinylidene chloride), poly(vinylidene fluoride) and the like;
2. Copolymers—Poly(vinyl chloride-vinyl acetate), poly(vinyl chloride-vinylidene chloride), poly(vinyl chloride-diethyl maleate), poly(vinyl chloride-vinyl fluoride), poly(vinyl fluoride-vinylidene fluoride) and the like; and,
3. Mixtures—Poly(vinyl chloride) and poly(chlorostyrene), poly(vinyl chloride) and poly(vinyl acetate), poly(vinyl chloride) and poly(vinylidene chloride), poly(vinyl chloride) and poly(vinyl ethyl ether), and the like.

The preferred resins of this invention are poly(vinyl chloride) and poly(vinylidene chloride). When using copolymers or mixtures, it is preferred that at least 50% by weight of the copolymer or mixture be derived from vinyl chloride and the remainder be derived from one or more olefinic monomers.

The resins can be intimately mixed with the smoke suppressant additive or mixture of additives in any convenient manner. For example, blenders or mixers that are known in the art may be employed using a variety of techniques. The additives are used in the range of 0.1 to about 30 parts for each 100 parts polymer and preferably from 1-15 parts are employed.

In the following examples the smoke suppressants are mixed with the resin using first a Waring Blender and then a Brabender Plastograph or a plastic mill. The resulting sheets are pressed under pressure to give plates of 1/16-inch thickness. Samples are cut into 3-inch×3-inch specimens that are burned in the NBS Smoke Chamber using the flamming mode in accordance with ASTM Special Technical Publication 422(1969) and NFPA 258-T "Smoke Generated by Solid Materials", May 1974. The average of two or more values are reported.

The following examples illustrate the present invention but are not intended to limit the invention thereto.

EXAMPLES 1-15

Preparation of Sample—Rigid PVC

| | Amount (parts) |
|---|---|
| PVC Resin (Type 235 from Tenneco) | 100.0 |
| Stabilizer [dibutyltin bis(isooctyl thioglycolate)] | 1.5 |
| Paraffin Wax (melting range 165° F.) | 1.0 |
| Acrylic Processing Aid | 3.0 |
| Smoke Suppressants to be tested | See Table Below |

| Example # | Smoke Suppressants | phr[1] | $D_{mc}$[2] | % Smoke Reduction |
|---|---|---|---|---|
| 1 | None | — | 505 | — |
| 2 | Ferrocene | 9.9 | 224 | 56 |
| 3 | $CuCO_3$ | 5.8 | 108 | 79 |
| 4 | $CoCO_3$ | 6.0 | 171 | 66 |
| 5 | $NiCO_3$ | 6.3 | 273 | 46 |
| 6 | $ZnCO_3$ | 5.7 | 359 | 29 |
| 7 | $Cr_2(CO_3)_3$ | 8.1 | 286 | 43 |
| 8 | $Ce_2(CO_3)_3$ | 5.8 | 463 | 8 |
| 9 | $Al_2(CO_3)_3$ | 6.3 | 316 | 37 |
| 10 | $CaCO_3$ | 7.4 | 446 | 12 |
| 11 | $BaCO_3$ | 4.3 | 470 | 7 |
| 12 | $Na_2CO_3$ | 6.8 | 489 | 3 |
| 13 | $K_2CO_3$ | 6.2 | 475 | 6 |
| 14 | $MoO_3$ | 4.5 | 379 | 23 |
| 15 | Ongard-1* | 8.5 | 439 | 11 |

[1] Based upon 3 g of metal in the formulation.
[2] Maximum smoke density (corrected) as obtained in the NBS Smoke Density Chamber.
*The trademark for an inorganic magnesium-zinc compound sold by NL Industries.

EXAMPLES 16-20

A comparison of copper carbonate and cobalt carbonate with the oxides is shown:

Preparation of Sample is the same as in Examples 1-15.

| Example # | Smoke Suppressant | phr | $D_{mc}$ | % Smoke Reduction |
|---|---|---|---|---|
| 16 | None | — | 518 | — |
| 17 | $CuCO_3$ | 15 | 77 | 85 |
| 18 | CuO | 15 | 118 | 77 |
| 19 | $CoCO_3$ | 15 | 159 | 69 |

| Example # | Smoke Suppressant | phr | $D_{mc}$ | % Smoke Reduction |
|---|---|---|---|---|
| 20 | $Co_3O_4$ | 15 | 294 | 43 |

While copper and cobalt carbonates are most effective in reducing smoke of vinyl chloride-based polymers substantially free of plasticizers, they provide improved smoke suppression when plasticizers are present. Vinyl chloride polymers are usually mixed with standard compounding ingredients known to those skilled in the art, (a) processing aids, (b) plasticizers, (c) lubricants, (d) stabilizers, (e) fillers, (f) colorants and the like.

Examples are:

(a) Acrylic polymers such as Acryloid K-120N-D (Rohm & Haas) or other related types.
   Low molecular weight styrenated polymers such as from alpha methyl styrene.
(b) Dialkyl phthalates: di-2-ethylhexylphthalate, n-octyl, n-decylphthalate, di-isodecylphthalate.
   Dialkyl adipates: di-2-ethylhexyl adipate, n-octyl, n-decyl adipate, di-isodecyl adipate.
(c) Calcium stearate, paraffin wax of various melting ranges such as 165° F. to 220° F.
(d) Stabilizers based on compounds of tin, lead or barium/cadmium such as dibutyltin bis(isooctylthioglycolate), lead sulfate, lead silicate sulfate, barium or cadmium fatty acid salts.
(e) Aluminum trihydrate, calcium carbonate.
(f) Titanium dioxide, carbon black.

These compounding ingredients may have some effect on the smoke suppression properties of copper and cobalt carbonates. Typical results are as noted in Examples 21 through 23.

EXAMPLES 21-23

Preparation of Sample (Wire Jacket PVC Formulation)

| | Amount |
|---|---|
| PVC (Geon 103FP-176) | 100.0 |
| Stabilizer (lead silicate sulfate) | 5.0 |
| Paraffin (melting range 165° F.) | 0.5 |
| Filler (Aluminum Trihydrate) | 30.0 |
| Smoke Suppressant to be Tested | 6.0 |
| Plasticizer (dialkyl phthalate of approximate mol. wt. of 414) | 40.0 |

| Example # | Smoke Suppressant | phr | $D_{mc}$ | % Smoke Reduction |
|---|---|---|---|---|
| 21 | None | — | 260 | — |
| 22 | $CoCO_3$ | 6.0 | 177 | 32 |
| 23 | $CuCO_3$ | 6.0 | 168–177 | 32–35 |

The use of copper and cobalt carbonate mixtures is also contemplated and both can be blended with the appropriate resin in any suitable proportion to give desired smoke suppression.

What is claimed:

1. A composition comprising 100 parts by weight of a poly(vinyl halide) resin and 0.1 to 30 parts by weight of cobalt carbonate.

2. The composition of claim 1 wherein the poly(vinyl halide) resin is poly(vinyl chloride) or poly(vinylidene chloride).

3. The composition of claim 1 wherein the poly(vinyl halide) resin is selected from the group consisting of poly(vinyl chloride-vinyl acetate), poly(vinyl chloride-vinyl fluoride) and poly(vinyl fluoride-vinylidene fluoride).

4. The composition of claim 1 wherein the poly(vinyl halide) is a mixture of poly(vinyl chloride) and up to 50% of a polymer selected from the group consisting of poly(chlorostyrene), poly(vinyl acetate), poly(vinylidene chloride), poly(vinyl ethyl ether).

5. The composition of claim 1 further comprises 1.5 parts of dibutyltin bis(isooctyl thioglycolate), 1.0 part of paraffin wax and 3.0 parts of acrylic processing aid.

6. The composition of claim 1 further comprising 5.0 parts of lead silicate sulfate stabilizer, 0.5 part paraffin wax, 30 parts aluminum trihydrate, 6 parts smoke suppressant and 40 parts dialkyl phthalate plasicizer.

7. A process for preparing a smoke suppressant poly(vinyl halide) resin comprising mixing a poly(vinyl halide) resin with a sufficient amount to reduce smoking of a smoke suppressant selected from the group of copper carbonate, cobalt carbonate and a mixture thereof.

8. The process of claim 7 wherein the poly(vinyl halide) resin is poly(vinyl chloride).

9. The process of claim 7 wherein the sufficient amount of the smoke suppressant in the range of 0.1 to 30 parts by weight per hundred parts resin.

10. A composition comprising 100 parts by weight of a poly(vinyl halide) resin and 0.1 to 30 parts by weight of copper carbonate.

11. A composition comprising 100 parts by weight of a poly(vinyl halide) resin and 0.1 to 30 parts by weight of a mixture of copper carbonate and cobalt carbonate.

* * * * *